United States Patent
Small et al.

(10) Patent No.: US 7,962,129 B2
(45) Date of Patent: *Jun. 14, 2011

(54) METHOD AND SYSTEM OF CREATING CUSTOMIZED RINGTONES

(75) Inventors: David B. Small, Dublin, CA (US);
Nalesh Chandra, Livermore, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1038 days.

This patent is subject to a terminal disclaimer.

(21) Appl. No.: 11/257,316

(22) Filed: Oct. 24, 2005

(65) Prior Publication Data

US 2007/0093242 A1    Apr. 26, 2007

(51) Int. Cl.
*H04M 3/00* (2006.01)

(52) U.S. Cl. .................. 455/419; 455/414.1; 455/414.4; 455/415

(58) Field of Classification Search .................. 455/567, 455/556, 550.1, 414.1, 414.4, 415, 418–420, 455/412.1, 412.2
See application file for complete search history.

(56) References Cited

U.S. PATENT DOCUMENTS

| | | | |
|---|---|---|---|
| 2002/0115456 A1 | 8/2002 | Narinen et al. | |
| 2003/0096605 A1* | 5/2003 | Schlieben et al. | 455/419 |
| 2003/0096639 A1* | 5/2003 | Cluff et al. | 455/567 |
| 2003/0109251 A1* | 6/2003 | Fujito et al. | 455/414 |
| 2003/0211867 A1* | 11/2003 | Bonnard et al. | 455/567 |
| 2003/0219110 A1* | 11/2003 | Tsai et al. | 379/373.01 |
| 2005/0170865 A1 | 8/2005 | Harvej et al. | |
| 2006/0293089 A1* | 12/2006 | Herberger et al. | 455/567 |

FOREIGN PATENT DOCUMENTS

GB    2 378 100 A    1/2003

OTHER PUBLICATIONS www.myphonefiles.com/software/voicetonesstudio.php, printed Sep. 14, 2005, 3 pages.
www.tunes4phones.com/ringtone-maker.html, printed Sep. 14, 2005, 1 page.
www.gizmodo.com/cellphones, printed Sep. 14, 2005, 2 pages
www.ringranger.com/home, printed Sep. 14, 2005, 1 page.
www,mobile-weblog.com/archives/mix_your_own_ringtones. html, printed Sep. 14, 2005, 2 pages.

* cited by examiner

*Primary Examiner* — Vincent P Harper
*Assistant Examiner* — Natasha Cosme
(74) *Attorney, Agent, or Firm* — Brooks Kushman P.C.

(57) ABSTRACT

A system for customizing ringtones. The system including a server configured to facilitate generating a customized ringtone based on a sample recording. The system including a phone configured to display a user interface as a function of customization signals received from the server. The customization signals being related to customization options available for customizing the recording sample. The phone being configured to communicate at least one user selected customization option to the server for use by the server in customizing the sample recording and generating the customized the ringtone.

13 Claims, 3 Drawing Sheets

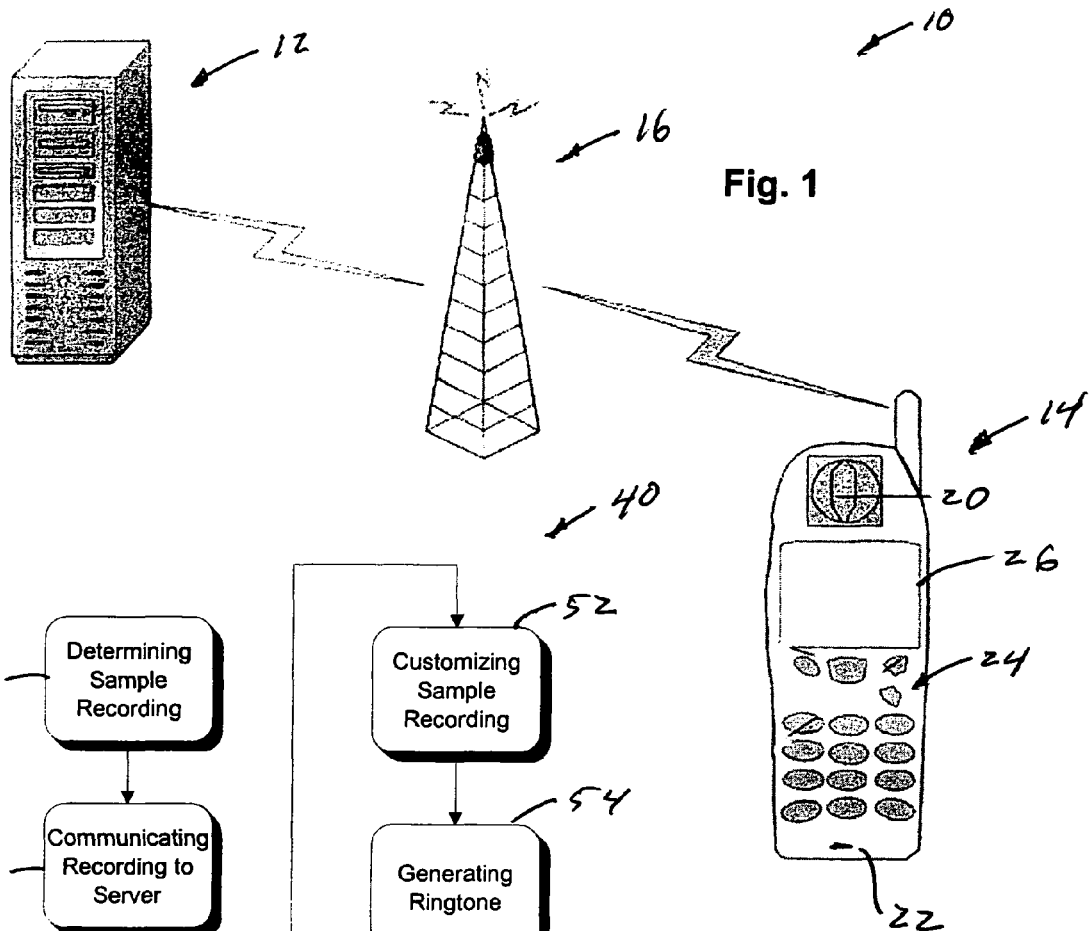

METHOD AND SYSTEM OF CREATING CUSTOMIZED RINGTONES

BACKGROUND OF THE INVENTION

1. Field of the Invention

The present disclosure relates to methods and systems of creating customized ringtones of the type used with mobile phones to alert a recipient of incoming calls.

2. Background Art

Mobile phones have become a platform for personal expression—with colorful covers and individual ring-tones, they've become a fashion statement as well. As a result, a new market has emerged to fill the need for individualized ringtones. For a few dollars, phone owners can "download" ringtones of favorite songs from a variety of providers. This has created a large, growing market to supply these ringtones.

With the emergence of handsets that can play "polyphonic" ringtones or, better yet, "realistic" ringtones, there is an untapped market opportunity for the complete customization of ringtones. While customers can order their favorite music as a ringtone, even a technically savvy person would have a difficult time doing any of the following:

Creating polyphonic ringtones of specific phrases of music
Creating ringtones of a less-widely known piece of music
Modifying the sound characteristics of a phrase of music (e.g., changing the echo, reverb, speed, octave, creating robotic effects, filtering out the voice, reproducing only the percussion, etc.)
Recording their own ringtone

BRIEF DESCRIPTION OF THE DRAWINGS

The present disclosure is pointed out with particularity in the appended claims. However, other features of the present disclosure will become more apparent and the present disclosure will be best understood by referring to the following detailed description in conjunction with the accompany drawings in which:

FIG. 1 illustrates a system for generating customized ringtones in accordance with one non-limiting aspect of the present disclosure;

FIG. 2 illustrates a flowchart of a method of customizing the ringtone in accordance with one non-limiting aspect of the present disclosure;

DETAILED DESCRIPTION OF THE PREFERRED EMBODIMENT(S)

Figure 3:
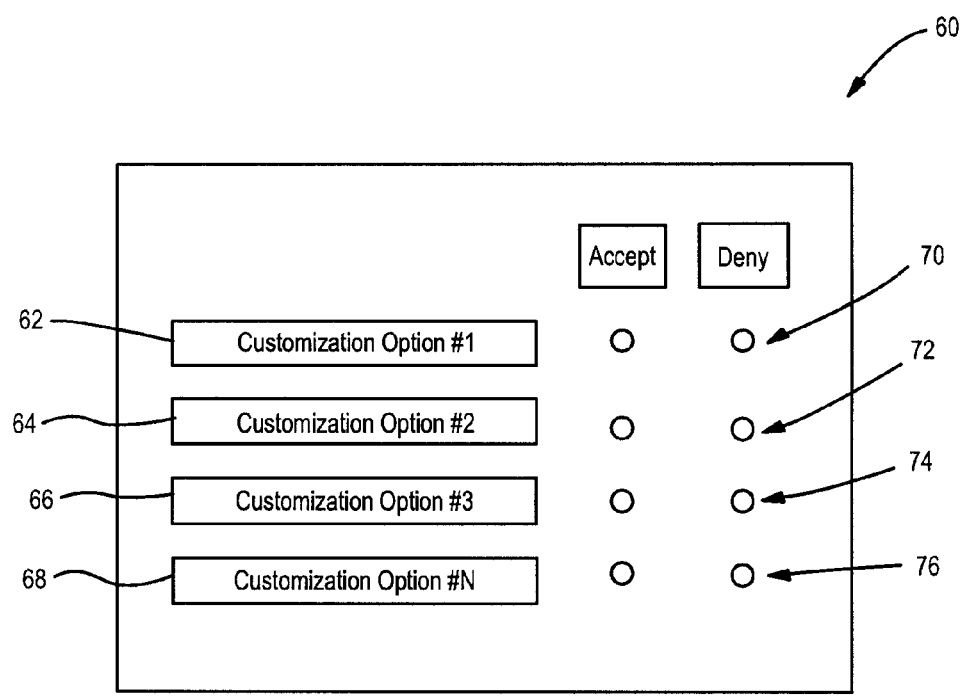
FIG. 3 illustrates a user interface having a number of limited selection menus in accordance with one non-limiting aspect of the present disclosure.

One non-limiting aspect of the present disclosure relates to a system for customizing ringtones. The system including a server configured to facilitate generating a customized ringtone based on a sample recording. The system including a phone configured to display a user interface as a function of customization signals received from the server. The customization signals being related to customization options available for customizing the recording sample. The phone being configured to communicate at least one user selected customization option to the server for use by the server in customizing the sample recording and generating the customized ringtone.

The customization signals may be configured to facilitate displaying the customization options in one or more limited selection menus within the user interface, wherein the limited selection menus only require the user to accept or deny the associated customization option.

The selectable customization options may be limited to one of a beat adjustment, an instrument change, an echo modification, and a sound characteristic adjustment.

The phone may be configured to communicate the sample recording to the server.

The phone may be configured to communicate audio files and/or multimedia files as the sample recording. Optionally, the phone may be configured to record the sample recording.

The server may select the available customization options as a function of a phone identifier received with the sample recording.

The server may generate the customized ringtone as a function of the phone identifier associated therewith.

One non-limiting aspect of the present disclosure relates to a method of customizing ringtones of the type used by a phone to alert a recipient of incoming calls. The method may include receiving a sample recording for customization as the ringtone, communicating selectable customization options to the phone, the customization options relating to options available for customizing the sample recording, detecting selection of at least one of the customization options, customizing the sample recording according to the selected customization option, and generating a ringtone from the customized sample, the ringtone suitable for use with the phone to alert the recipient of incoming calls.

The method may further include communicating the customization options to the phone in a customization message and determining the selected customization option as a function of a response thereto.

The method may further include determining the selectable customization options included within the message as a function of a phone identifier associated with the phone.

The method may further include detecting the selected customization option as a function of signals received from the phone, including the phone identifier with the signals received from the phone, and transporting the ringtone to the phone associated with the phone identifier The method may further include configuring the customization message to display a user interface on the phone in order to facilitate generating the response to the customization message.

The method may further include configuring the customization message to operate with a user interface application included on the phone such that the user interface application generates a user interface on the phone to facilitate generating the response to the customization message.

The method may further include configuring the customization message to display the customization options in limited selection menus within the user interface, wherein the limited selection menus only require the user to accept or deny the associated customization option.

The method may further include communicating the selectable customization options to the phone from a server located remotely from the phone and only after receiving the sample recording from the phone.

The method may further include communicating the customized sample recording to the phone for playback prior to generating the customized ringtone from the sample recording.

The method may further include generating the customized ringtone upon receipt of a converting message received from the phone in response to playing back the customized sample recording on the phone.

The method may further include determining the selectable customization options to be limited to one of a beat adjustment, an instrument change, an echo modification, and a sound characteristic adjustment.

The method may further include the recording sample being an audio file and transporting the file from the phone for receipt at a remotely located server, wherein the server customizes the sample recording and generates the customized ringtone as a function thereof.

The method may further include the recording sample being a multimedia file and transporting the file from the phone for receipt at a remotely located server, wherein the server customizes the sample recording and generates the customized ringtone as a function thereof.

One non-limiting aspect of the present disclosure relates to a computer-readable medium for customizing ringtones used by a phone. The computer-readable medium including instructions for communicating selectable customization options to the phone, the selectable customization options relating to options available for customizing a sample recording, detecting selection of at least one of the selectable customization options, customizing the sample recording according to the selected customization option to generate a customized sample, and generating a ringtone from the customized sample.

The computer-readable medium may further include instructions for communicating the customization options to the phone in a customization message and determining the selected customization option as a function of a response thereto.

The computer-readable medium may further include instructions for determining the selectable customization options included within the message as a function of a phone identifier associated with the phone.

The computer-readable medium may further include instructions for configuring the customization message to display a user interface on the phone in order to facilitate generating the response to the customization message.

The computer-readable medium may further include instructions for configuring the customization message to display the customization options in limited selection menus within the user interface, wherein the limited selection menus only require the user to accept or deny the associated customization option.

One non-limiting aspect of the present invention relates to a user interface for use with a phone display to facilitate customizing ringtones. The user interface includes a number of customization options for use in customizing a sample recording and a number of limited selection fields for either accepting or denying the customization options.

The user interface may display the selectable customization options as a function of signals received from a server located remotely from the phone.

The user interface may control the phone to transmit signals for indicating selections made for one or more of the limited selection fields.

FIG. 1 illustrates a system 10 for generating customized ringtones in accordance with one non-limiting aspect of the present disclosure. The system 10 may include a server 12 and phone 14. A network 16 or other communication element may be included for facilitating communications between the server 12 and the phone 14. The server 12 may be part of a cellular network or other wireline or wireless phone network associated with the phone.

The phone 14 may be configured to support telephone communications through signaling services provided through the network 16, as one having ordinary skill in the art will appreciate. In response to incoming calls or other phone alerts, the phone 14 may be configured to playback a ringtone stored in a memory thereof (not shown). The phone 14 may include features, processors, applications, or other elements to facilitate playback of the ringtone.

The ringtone may be a downloadable feature stored on the phone 14 to facilitate alerting the user of various operating conditions, such as to incoming calls or other alerts, such as an alarm, message alert, etc. The ringtone may include audio, video, static pictures, and/or some combination thereof, depending on the capabilities of the phone to support various applications and operations. The ringtone may include features for associating itself with elements stored on the phone 14, such as to permit playback of an audio only ringtone with corresponding display of a picture separately stored on the phone.

The phone 14 may include a speaker 20, microphone 22, keypad 24, and display 26 to facilitate the operation thereof and the playback of the ringtone. The speaker 20 may be a typical speaker used for projecting sounds and other audio to a surrounding area. The display 26 may be a mono- or multi-color display configured to display alphanumeric messages and other features, including moving images and video. Optionally, the display 26 may be a touch-screen or other feature configured to receive user inputs.

The keypad 24 may include any number of buttons and other user actuatable features for receiving any number of user inputs. Lights and other features may be included to backlight or otherwise illuminate the keypad 24 and other portions of the phone 14, such as in response to user inputs and/or playback of the ringtone. The microphone 22 is a typical microphone configured to communicate audio signals from a user through the phone system. Optionally, the microphone 22 may support recording and storing audio on the phone.

The phone 14 may include any number of other features and options, including other inputs, cards, and interfaces. For example, the phone 14 may include an interface, such as a cable jack, USB port, etc., for connecting the phone to a computer or other electronic device. The phone 14 may also include any number of embedded or downloaded applications and programs to facilitate the operation thereof. Optionally, one of the applications may be a user interface application that permits various features and messages to be visualized on the display 26 so that user inputs in response thereto may be monitored, such as by coordinating the information displayed in the user interface with user selections of the keypad and/or touch-screen.

FIG. 2 illustrates a flowchart 40 of a method of customizing the ringtone in accordance with one non-limiting aspect of the present disclosure. The method generally relates to the server 12 or other feature associated with the phone network 16 being configured to facilitate generating a customized ringtone for use by the phone 14. The method is described with respect to the customized ringtone being generated for use with a mobile phone, however, the method applies to any number of environments and applications where it is desirable to provide a ringtone or similar feature to an electronic device for use in alerting a user of incoming calls or other alerts/messages.

Block 42 relates to determining a sample recording that will comprise at least a portion of the ringtone. The sample recording may be an audio, video, audio-static image, or other element having some combination thereof. The recording may be stored in an electronic medium for electronic communication and manipulation. The recording may, for example, be recorded on the phone 14, with the microphone 22 or other video/picture recording feature, such as in response to a user speaking into the microphone and/or placing the microphone in close proximity to another audio unit. Optionally, the sample recording may be selected from a webpage, compact disc, or other medium.

The sample recording may be of a relatively short duration, such as a couple seconds, and/or of some longer duration, depending on the desires of the user and the capabilities of the phone 14. If the sample recording is made and stored directly on the phone through the microphone, the phone 14 may only be able to store a relatively short sample recording, such as a couple of minutes. However, as advances in memory storage progress, larger storage capabilities may be available to support longer recordings and/or recordings requiring more data, such as videos and other image based items.

Block 44 relates to communicating the sample recording to the server 12 for customization. The server 12 may be considered to be a customization server as it includes features and capabilities for synthesizing the sample recording. For example, the server 12 may include applications to facilitate electronically generating any number of sounds based on the recording. If the recording is an audio file, the customization server may include features for customizing the sound associated therewith, such as through beat or rhythm adjustments, an instrument change, an echo modification, and/or a sound characteristic adjustment, synthesizing options associated with electronic/digital keyboards, and the like.

The sample recording may be communicated to the server 12 through any number of mediums and messaging systems. Optionally, the sample recording is transferred directly from the phone 14 to the server 12 over the phone network 16. A phone identifier or other feature may be communicated with the sample recording to identify the phone associated therewith. The phone identifier may be automatically added to the sample recording by the phone 14 and/or inputted by the user, such as if the user inputs a phone identifier when communicating the sample recording to the server from a source other than the phone.

Block 46 relates to the server 12 identifying the phone communicating the sample recording. The server 12 may communicate with a service provider associated with the phone 14 or other database to identify the type of phone associated with recording and/or the type of phone 14 for which the ringtone is intended to be used with, i.e., a user may create and transport the recording from a phone other than the phone to which the ringtone is intended to be used with. Once the phone, and optionally the user associated therewith, is identified, the server may determine parameters associated with the phone.

The phone parameters may relate to ringtone capabilities of the phone 14, such as the audio, video, or display capabilities of the phone, its application capabilities or operating system, and other subscription related features, such as limitations imposed on the user by the service provider. For example, the subscribers features may specify the number of ringtones the user is permitted to create, billing procedures associated with generating the ringtone, and/or other features associated with the service provider.

Block 48 relates to determining a number of customization options available for creating sounds from the sample recording. The customization options may be related to any number of features associated with altering and/or adjusting the sound or other features associated with the sample recording. As such, the server 12 may determine the customization features as a function of the sample recording, i.e., whether it is audio, pictures, or video, and the capabilities of the phone associated therewith.

The available customization features may then be communicated to the phone 14 for user selection. The server 12 may communicate a customization message to the phone for indicating the available customization options. The message may be a text message or other message in which the available options are listed and the user can select one or more of them for use in customizing the sample recoding. Optionally, the message may be formatted to provide a limited selection menu where the user only needs to accept or deny the customization features. This requires the message to particularly specify the operation being performed, such as through 'canned' or predefined operations, but advantageously, allows the user to easily execute the operation without having to have any general knowledge about sound structure and the alteration thereof, as it is predefined by the customization option.

Alternatively, the customization message may be a self-executing user interface application that operates with the phone display 26 to display a user interface through which the user may select one or more of the available customization options. The self-executing nature of the message may be advantageous for use with a phone 14 that may not include a ringtone customization feature or other similar application to support displaying and selecting the customization options. The configuration of the message may be determined as a function of the phone identifier. Optionally, the customization message needs to be a self-executing application, such as if the phone 14 already includes a user interface feature whereby a simpler message can be delivered to facilitate selection of the customization options.

Still further, the customization message may be an interactive voice recording (IVR) instigated by the phone with the server. The IVR may include the server automatically dialing the phone and/or requesting the user to dial the IVR, and issuing the available customization options to the user through voice prompts. The user may then reply to the voice prompts by voice and/or with selections on the keypad 24 to facilitate selection of one or more of the customization options.

Block 50 relates to the user selecting one or more of the customization options and communicating the selection thereof to the customization server 12. The selections may be made by the user simply accepting or denying the predefined customization options. These so called limited selection menus allows the present disclosure to provide simple and efficient manner for non-musically inclined users to customize the sample recording to their desired specifications. Multiple selections may be made to customize the sample recording as desired.

Block 52 relates to generating a customized sound based on the selected customization options. Optionally, after each customization selection and/or after a predefined number of operations or the close of selection, the server 12 may be configured to generate the customized sound from the sample recording and to deliver it to the phone for playback and/or for playback while interacting with the IVR. The user may then listen to the customization message and confirm or deny their acceptance thereof prior to generating the ringtone.

Block 54 relates to generating a customized ringtone generated from the customized sounds. The ringtone generally relates to creating the sound into a format suitable for use with the phone 14 and its ringtone features. For example, some phones may be unable to playback certain audio files, such that ringtone may be generated to permit playback of the audio for the audio constraints of the phone. Optionally, if the ringtone is intended for a recipient other than the individual creating it, this step may comprise formatting the sounds to function as a ringtone on the desired recipient's phone. The capabilities and characteristics of the phone 14 may be determined to facilitate creation of the ringtone.

Block 56 relates to transporting the customized ringtone to the identified phone. The phone 14 may accept the ringtone and display user options for associating the ringtone with desired phone operations, such as to associate the ringtone with incoming calls or other phone alerts. Optionally, the user may specify other phone identifiers so that other phones may receive copies of the ringtone, such as to permit sharing of the customized ringtone. The server may be required to generate different ringtones of the other phones, depending on the capabilities and operating systems thereof.

FIG. 3 illustrates the display 26 providing a user interface 60 having a number of limited selection menus 62, 64, 66, and 68 in accordance with one non-limiting aspect of the present invention. The limited selection menus 62, 64, 66, and 68 may correspond with one or more of the customization options determined in Block 48 to be available for the phone 14. Any number of customization options, however, may be included. Input fields 70, 72, 74, and 76 may be included to receive user instructions as to whether to accept or deny the customization option associated therewith. The selection(s) may be communicated to the server 12 for further processing, as described above.

Figure 4:
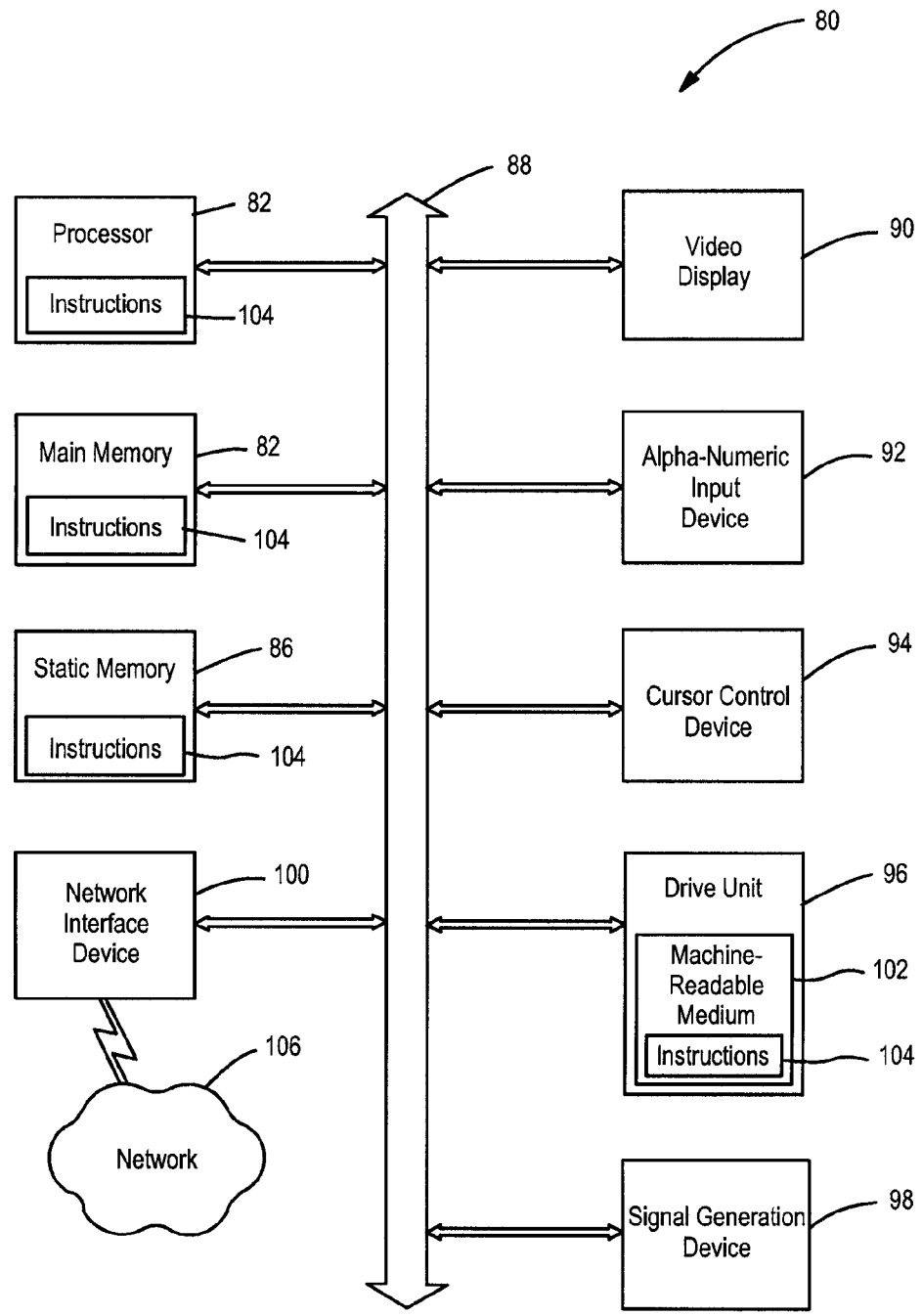
FIG. 4 is a diagrammatic representation of a machine in the form of a computer system within which a set of instructions, when executed, may cause the machine to perform any one or more of the methodologies of the present disclosure.

FIG. 4 is a diagrammatic representation of a machine in the form of a computer system 80 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 80 may include a processor 82 (e.g., a central processing unit (CPU), a graphics processing unit (GPU), or both), a main memory 84 and a static memory 86, which communicate with each other via a bus 88. The computer system 80 may further include a video display unit 90 (e.g., a liquid crystal display (LCD), a flat panel, a solid state display, or a cathode ray tube (CRT)). The computer system 80 may include an input device 92 (e.g., a keyboard), a cursor control device 94 (e.g., a mouse), a disk drive unit 96, a signal generation device 98 (e.g., a speaker or remote control) and a network interface device 100.

The disk drive unit 96 may include a machine-readable medium 102 on which is stored one or more sets of instructions (e.g., software 104) embodying any one or more of the methodologies or functions described herein, including those methods illustrated in herein above. The instructions 104 may also reside, completely or at least partially, within the main memory 84, the static memory 86, and/or within the processor 82 during execution thereof by the computer system 80. The main memory 84 and the processor 82 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 104, or that which receives and executes instructions 104 from a propagated signal so that a device connected to a network environment 106 can send or receive voice, video or data, and to communicate over the network 106 using the instructions 104. The instructions 104 may further be transmitted or received over the network 106 via the network interface device 100.

While the machine-readable medium 102 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for customizing ringtones, the system comprising:
   a server configured to generate a customized ringtone based on a sample recording, wherein the server is configured to select customization options available for customizing the sample recording as a function of a phone identifier indicative of ringtone capabilities of a type of phone and to provide customization signals related to the available customization options; and
   a phone associated with the phone identifier, the phone being configured to receive the customization signals from the server and to display a user interface as a function of the customization signals received from the server such that the user interface displays the customization options available for customizing the recording sample for a user to select;
   wherein the phone is configured to communicate at least one user selected customization option to the server for use by the server in customizing the sample recording and generating the customized ringtone based on the customized sample recording.

2. The system of claim 1 wherein the customization signals are configured to facilitate displaying the customization options in one or more limited selection menus within the user interface, wherein the limited selection menus only require the user to accept or deny the associated customization option.

3. The system of claim 1 wherein the selectable customization options include at least one of a beat adjustment, an instrument change, an echo modification, and a sound characteristic adjustment.

4. The system of claim 1 wherein the phone is configured to communicate the sample recording to the server.

5. The system of claim 4 wherein the phone is configured to record the sample recording prior to communicating the sample recording to the server.

6. The system of claim 4 wherein the phone is configured to communicate the phone identifier with the sample recording to the server.

7. A system for customizing ringtones, the system comprising:
   a server configured to generate a customized ringtone based on a sample recording; and
   a phone configured to communicate the sample recording to the server, the phone further configured to display a user interface as a function of customization signals received from the server, the customization signals related to customization options available for customizing the recording sample;
   wherein the server selects the available customization options as a function of a phone identifier received with the sample recording, wherein the phone identifier is indicative of ringtone capabilities of the phone;
   wherein the phone is configured to communicate at least one user selected customization option to the server for use by the server in customizing the sample recording and generating the customized ringtone based on the customized sample recording.

8. The system of claim 7 wherein:
   the customization signals are configured to facilitate displaying the customization options in one or more limited selection menus within the user interface, wherein the limited selection menus only require the user to accept or deny the associated customization option.

9. The system of claim 7 wherein:
the selectable customization options include at least one of a beat adjustment, an instrument change, an echo modification, and a sound characteristic adjustment.

10. The system of claim 7 wherein:
the phone is configured to record the sample recording.

11. The system of claim 7 wherein:
the phone is configured to communicate the phone identifier with the sample recording to the server.

12. A system comprising:
a phone; and
a server configured to determine customization options available for customizing a recording based on ringtone capabilities of a phone and communicate the available customization options to the phone;
the phone configured to display a user interface having the available customization options for a user of the phone to select and communicate the available customization options selected by the user to the server;
the server further configured to customize the recording according to the available customization options selected by the user to thereby generate a customized recording, generate a customized ringtone based on the customized recording, and transmit the customized ringtone to the phone for use by the phone in alerting the user of incoming communications.

13. The system of claim 12 wherein: the phone is configured to communicate the recording to the server.

* * * * *